United States Patent
Kurian et al.

(10) Patent No.: US 10,374,801 B2
(45) Date of Patent: Aug. 6, 2019

(54) FILE SECURITY TOOL

(71) Applicant: BANK OF AMERICA CORPORATION, Charlotte, NC (US)

(72) Inventors: Manu J. Kurian, Dallas, TX (US); Monika V. Kapur, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 118 days.

(21) Appl. No.: 15/650,278

(22) Filed: Jul. 14, 2017

(65) Prior Publication Data

US 2019/0020474 A1 Jan. 17, 2019

(51) Int. Cl.
| | |
|---|---|
| *G06F 21/00* | (2013.01) |
| *H04L 9/14* | (2006.01) |
| *H04L 9/08* | (2006.01) |
| *G06F 21/62* | (2013.01) |
| *G06F 21/64* | (2013.01) |
| *H04L 9/32* | (2006.01) |
| *G06F 21/60* | (2013.01) |

(52) U.S. Cl.
CPC ............ *H04L 9/14* (2013.01); *G06F 21/6227* (2013.01); *G06F 21/64* (2013.01); *H04L 9/0816* (2013.01); *H04L 9/3255* (2013.01); *G06F 21/602* (2013.01); *G06F 21/6218* (2013.01); *G06F 2221/2107* (2013.01)

(58) Field of Classification Search
CPC ................................ H04L 9/14; H04L 9/0816
See application file for complete search history.

(56) References Cited

U.S. PATENT DOCUMENTS

| | | | | |
|---|---|---|---|---|
| 6,052,693 | A * | 4/2000 | Smith | ..................... G06F 16/86 |
| 7,290,279 | B2 * | 10/2007 | Eun | ..................... G06F 21/6209 |
| | | | | 713/185 |
| 8,234,372 | B2 * | 7/2012 | Knapp | ..................... G06F 16/10 |
| | | | | 709/224 |
| 8,949,706 | B2 * | 2/2015 | McCabe | ................ G06Q 10/10 |
| | | | | 713/179 |

(Continued)

OTHER PUBLICATIONS

"Transform business processes with electronic and digital signatures," https://acrobat.adobe.com/content/dam/doc-cloud/en/pdfs/adobe-transform-business-processes-with-electronic-and-digital-signature-solutions.pdf, Feb. 2017.

(Continued)

*Primary Examiner* — Ali Shayanfar
(74) *Attorney, Agent, or Firm* — Michael A. Springs

(57) ABSTRACT

An apparatus includes a tokenizer and a validator. The tokenizer divides a file into first, second, and third portions. The tokenizer also encrypts the first, second, and third portions using a first key to produce first, second, and third tokens. The validator receives a fourth token with a signature of a first user and receives a fifth token with a signature of a second user. The validator also combines the first token, the fourth token, and the fifth token to produce a second key and determines whether the second key matches the first key. If the second key does not match the first key, the validator communicates an alert indicating that the first key does not match the second key. If the second key does match the first key, the validator decrypts first, fourth, and fifth tokens to reproduce the file.

18 Claims, 3 Drawing Sheets

(56) References Cited

U.S. PATENT DOCUMENTS

| | | | |
|---|---|---|---|
| 8,949,708 B2 | 2/2015 | Peterson | |
| 9,043,890 B1 | 5/2015 | Luo | |
| 9,230,130 B2 | 1/2016 | Peterson | |
| 9,251,131 B2 | 2/2016 | McCabe | |
| 9,634,975 B2 | 4/2017 | McCabe | |
| 9,679,160 B1* | 6/2017 | Zhang | H04L 9/14 |
| 9,805,210 B2* | 10/2017 | Nord | G06F 21/602 |
| 2004/0172549 A1* | 9/2004 | Kojima | G11B 20/00086 |
| | | | 713/193 |
| 2007/0044060 A1* | 2/2007 | Waller | G06F 17/5081 |
| | | | 716/52 |
| 2008/0244724 A1* | 10/2008 | Choe | G06F 21/33 |
| | | | 726/12 |
| 2008/0253559 A1* | 10/2008 | Chao | G06F 21/6218 |
| | | | 380/28 |
| 2012/0265976 A1* | 10/2012 | Spiers | H04L 63/0218 |
| | | | 713/2 |
| 2014/0100885 A1 | 4/2014 | Stern | |
| 2014/0164154 A1* | 6/2014 | Ramaci | G06Q 20/3674 |
| | | | 705/16 |
| 2015/0081566 A1* | 3/2015 | Slepinin | G06Q 20/3829 |
| | | | 705/69 |
| 2016/0019396 A1* | 1/2016 | Davis | G06F 21/6209 |
| | | | 713/193 |
| 2016/0292670 A1* | 10/2016 | Lu | G06F 21/77 |
| 2017/0012949 A1* | 1/2017 | Boren | H04L 9/0869 |
| 2017/0243015 A1* | 8/2017 | Shahi | G06F 21/6209 |
| 2017/0244672 A1* | 8/2017 | Shulman | H04L 63/0245 |
| 2018/0189502 A1* | 7/2018 | Kumar | G06F 21/602 |

OTHER PUBLICATIONS

"The Difference Between Electronic Signatures and Digital Signatures," https://www.globalsign.com/en/blog/electronic-signatures-vs-digital-signatures/, Jun. 1, 2016.

* cited by examiner

US 10,374,801 B2

FILE SECURITY TOOL

TECHNICAL FIELD

This disclosure relates generally to data security.

BACKGROUND

Digital data is communicated to various individuals to conduct transactions. These individuals may use or add digital data to confirm the transaction.

SUMMARY OF THE DISCLOSURE

According to an embodiment, an apparatus includes a tokenizer and a validator. The tokenizer divides a file into a first portion, a second portion, and a third portion. The tokenizer also encrypts the first portion using a first key to produce a first token, encrypts the second portion using the first key to produce a second token, and encrypts the third portion using the first key to produce a third token. The validator receives a fourth token with a signature of a first user and receives a fifth token with a signature of a second user. The validator also combines the first token, the fourth token, and the fifth token to produce a second key and determines whether the second key matches the first key. If the second key does not match the first key, the validator communicates an alert indicating that the first key does not match the second key. If the second key does match the first key, the validator decrypts first, fourth, and fifth tokens to reproduce the file.

According to another embodiment, a method includes dividing a file into a first portion, a second portion, and a third portion, encrypting the first portion using a first key to produce a first token, encrypting the second portion using the first key to produce a second token, and encrypting the third portion using the first key to produce a third token. The method also includes receiving a fourth token with a signature of a first user and receiving a fifth token with a signature of a second user. The method further includes combining the first token, the fourth token, and the fifth token to produce a second key and determining whether the second key matches the first key. The method includes, if the second key does not match the first key, communicating an alert indicating that the first key does not match the second key. The method includes, if the second key does match the first key, decrypting first, fourth, and fifth tokens to reproduce the file.

According to yet another embodiment, a system includes a device of a first user and a file security tool. The file security tool divides a file into a first portion, a second portion, and a third portion, encrypts the first portion using a first key to produce a first token, encrypts the second portion using the first key to produce a second token, and encrypts the third portion using the first key to produce a third token. The file security tool also receives, from the device, a fourth token with a signature of the first user and receives a fifth token with a signature of a second user. The file security tool further combines the first token, the fourth token, and the fifth token to produce a second key and determines whether the second key matches the first key. The file security tool also, if the second key does not match the first key, communicates an alert indicating that the first key does not match the second key and, if the second key does match the first key, decrypts first, fourth, and fifth tokens to reproduce the file.

Certain embodiments provide one or more technical advantages. For example, an embodiment improves the security of a cloud environment by determining solutions for security breaches based on the type of the cloud environment. As another example, an embodiment improves the security of a cloud environment by selecting appropriate monitoring tools for the type of the cloud environment. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
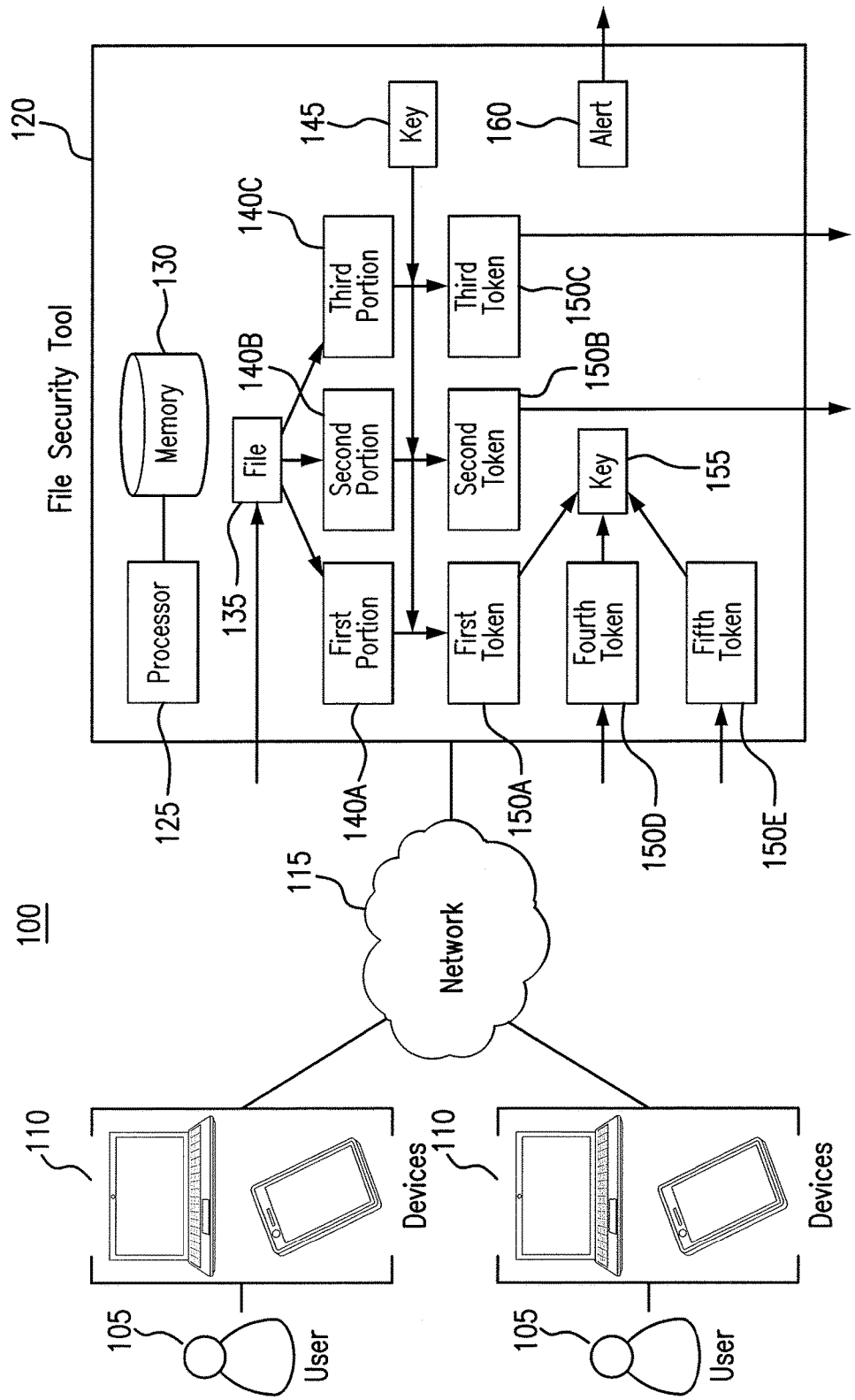
FIG. 1 illustrates a file security system.
Figure 2:
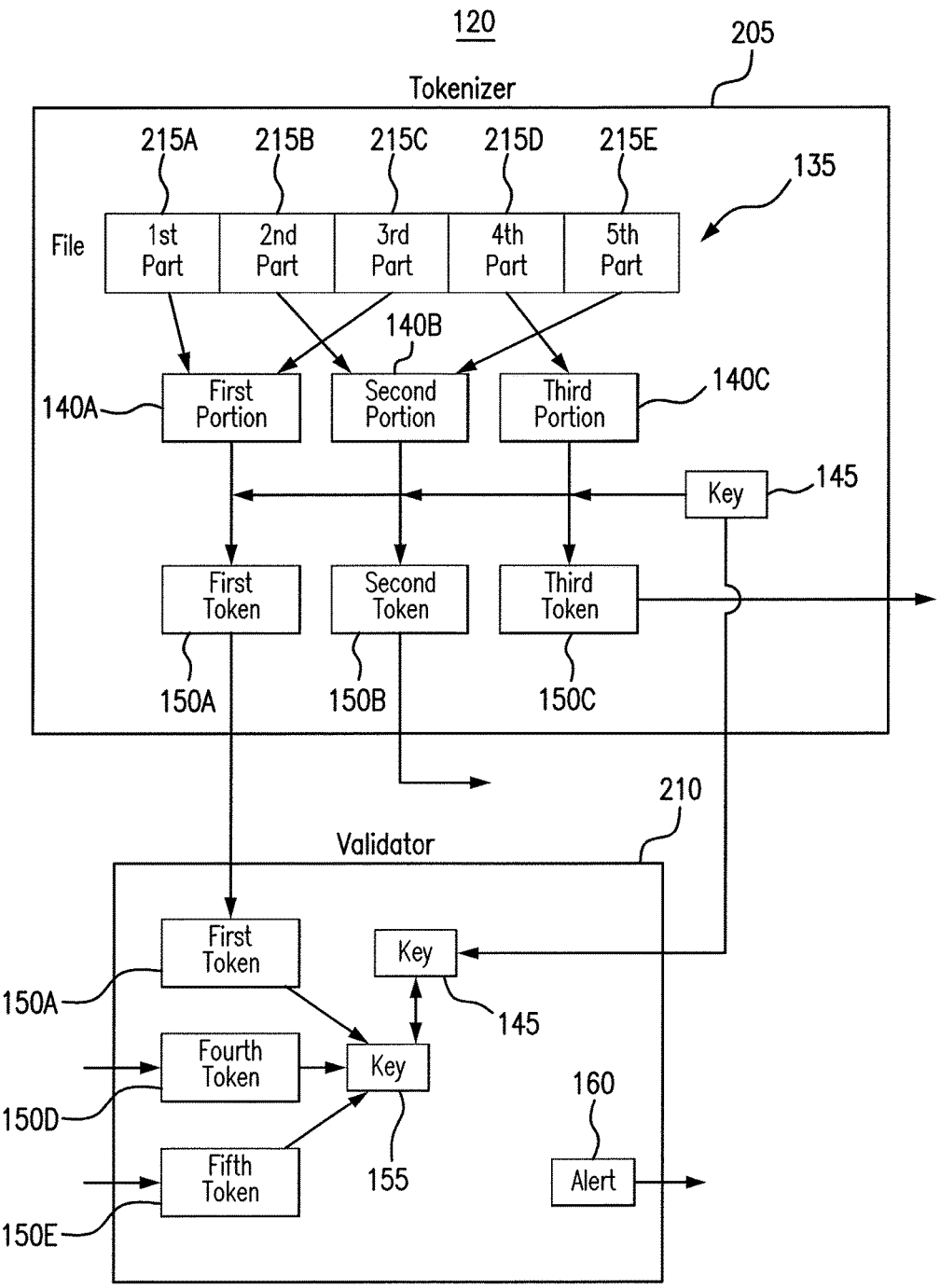
FIG. 2 illustrates a file security tool of the system of FIG. 1.
Figure 3:
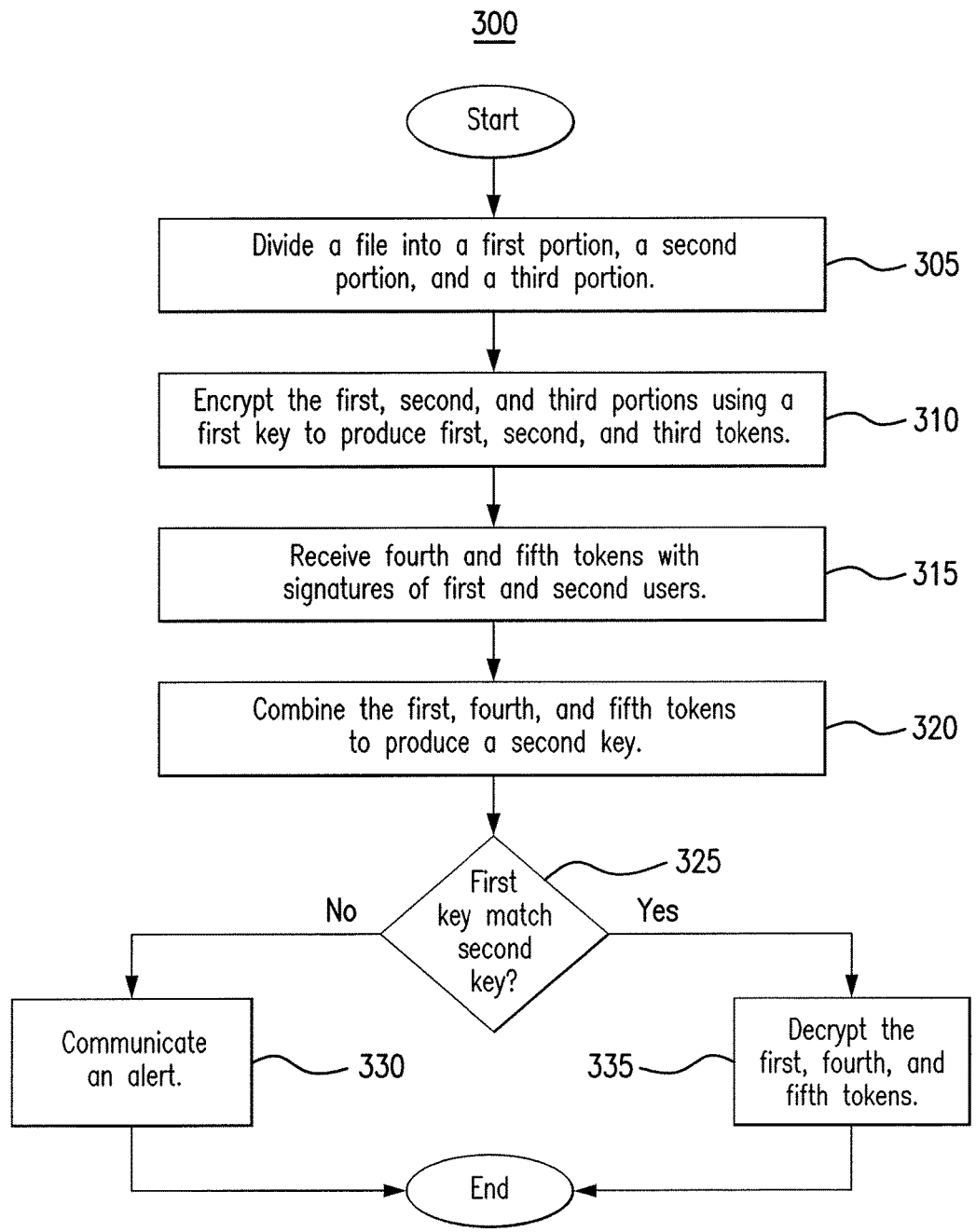
FIG. 3 is a flowchart illustrating a method for securing a file using the system of FIG. 1.

Embodiments of the present disclosure and its advantages are best understood by referring to FIGS. 1 through 3 of the drawings, like numerals being used for like and corresponding parts of the various drawings.

Digital data is communicated to various individuals to conduct transactions. For example, contracts and other agreements are typically sent to various parties for review and signature. These contracts may be sent electronically through email or through other electronic means. The parties may review the data electronically and then add their own digital data to these agreements. For example, parties may add digital signatures or images to the agreements before sending the agreements back to an originating party.

One drawback of conducting transactions electronically is the risk of forged or faked information. For example, when an agreement is sent electronically, there is a risk that the agreement may be intercepted and signed without the intended party's knowledge. As another example, an unscrupulous party may manipulate an agreement electronically so as to distort or change the agreement in a way to which the parties did not consent.

As an illustrative example, when a minor or child wants to buy a vehicle, a dealership will typically not enter into a sales agreement only with the minor. Rather, the dealership will have the minor's parents or guardian enter into the sales agreement as well. This way, the dealership protects itself against non-payment by the minor child. As a result, both the minor and the parent and/or guardian must sign an agreement with the dealership. In certain instances, the transaction may be conducted electronically such as, for example, when the parent or guardian is not physically located in the same area as the minor child who is attempting to purchase the vehicle. In these instances, the minor child may forge his parent's electronic signature on the sales agreement without the dealership's or the parent's knowledge. The dealership may also not be able to determine whether the child or the parent manipulated the agreement prior to adding a digital signature. Thus, there is a security risk for the agreement after it is sent to the minor and/or the parent.

This disclosure contemplates a file security tool that improves data or file security in certain embodiments. The file security tool divides a file into distinct portions and then tokenizes these portions. The file security tool then communicates these tokens to various parties. When the parties return their tokens, the file security tool determines whether the parties have appropriately treated their tokens by reassembling the received tokens. After reassembling the received tokens, the file security tool determines whether the reassembled file corresponds to the original file. If so, the file security tool can determine that the parties have appropriately treated their portions of the file.

The file security tool will be described using FIGS. 1 through 3. FIG. 1 will describe the file security tool generally. FIGS. 2 and 3 will describe the file security tool in more detail.

FIG. 1 illustrates a file security system 100. As illustrated in FIG. 1, system 100 includes one or more users 105, one or more devices 110, a network 115, and a file security tool 120. In particular embodiments, system 100 improves the security of data and/or files by dividing the file and tokenizing the divided portions for different users.

Devices 110 may be used by users 105 to receive and communicate tokens. Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

File security tool 120 may improve the security of data and/or files by dividing the files and tokenizing the divided portions. As illustrated in FIG. 1, file security tool 120 includes a processor 125 and a memory 130. This disclosure contemplates processor 125 and memory 130 being configured to perform any of the functions of file security tool 120 disclosed herein.

Processor 125 is any electronic circuitry, including, but not limited to microprocessors, application specific integrated circuits (ASIC), application specific instruction set processor (ASIP), and/or state machines, that communicatively couples to memory 130 and controls the operation of file security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of file security tool 120 by processing information received from network 115, device(s) 110, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

File security tool 120 receives a file 135. In certain embodiments, file 135 may have been received from one or more devices 110. File security tool 120 may divide file 135 into separate portions. Using the previous example, file 135 may be an agreement to sell a vehicle. If the vehicle is being sold to a minor, then the minor and the minor's parent may need to sign the agreement before the vehicle can be sold to the minor.

In certain instances, after a dealership sends the agreement to the minor, the dealership has no way of ensuring that the signature of the minor's parent that is returned is authentic. In other words, the minor may forge the parent's electronic signature without the parent's knowledge and send the agreement back to the dealer. In some instances, the dealer may also not know whether the minor or the parent has manipulated the agreement electronically before sending it back to the dealer. For example, the parent may adjust the warranties or guaranties within the agreement and attempt to conceal that change from the dealer. In particular embodiments, file security tool 120 addresses these types of security concerns for file 135.

File security tool 120 divides file 135 into portions 140. In the illustrated example of FIG. 1, file security tool 120 divides file 135 into a first portion 140A, second portion 140B, and third portion 140C. This disclosure contemplates file security tool 120 dividing file 135 into any number of portions. Furthermore, the portions need not represent a sequential ordering of file 135. In other words, file 135 may not be reconstructed simply by placing the portions sequentially next to each other.

After dividing file 135 into portions 140, file security tool 120 may tokenize the various portions 140 using a key 145. In the illustrated example of FIG. 1, file security tool 120 uses key 145 to tokenize first portion 140A, second portion 140B, and third portion 140C to produce first token 150A, second token 150B, and third token 150C, respectively. This disclosure contemplates that tokenization involves certain processes such as encryption. For example, file security tool 120 may use key 145 to encrypt first portion 140A, second portion 140B, and third portion 140C to produce first token 150A, second token 150B and third token 150C, respectively. File security tool 120 may then communicate one or more of the tokens 150 to various parties.

Each party may receive its token 150 and adds a digital signature. Using the illustrated example of FIG. 1, a party may add its digital signature to second token 150B or third token 150C to produce fourth token 150D and fifth token 150E, respectively. After the digital signature has been added, the party may communicate fourth token 150D or fifth token 150E back to file security tool 120.

File security tool 120 may combine first token 150A, fourth token 150D, and fifth token 150E to generate a second key 155. File security tool 120 may then compare key 145 with second key 155 to determine if they match. If key 145 matches second key 155, file security tool 120 may be assured that the digital signatures are authentic and that no data manipulation has occurred. File security took 120 may then decrypt first token 150A, fourth token 150D, and fifth token 150E to reproduce first portion 140A, second portion 140B, and third portion 140C. File security tool may then reconstruct file 135 with the added digital signatures. If key 145 does not match second key 155, file security tool 120 may communicate an alert 160 that indicates that inappropriate treatment has been given to second token 150B or third token 150C. For example, alert 160 may indicate that signatures have been forged or that the file 135 has been manipulated in some way by a party.

Using the previous example of selling a vehicle to a minor, file security tool 120 may divide a sale agreement into portions 140. File security tool 120 may then encrypt the portions 140 to generate first token 150A, second token 150B, and third token 150C. File security tool 120 may then communicate second token 150B to a device 110 of the minor. File security tool 120 may then communicate third token 150C to a device 110 of the parent or file security tool 120 may communicate third token 150C to a device 110 of the minor with instructions to forward to the parent. The minor may add his digital signature to his received portion of the agreement in second token 15Bb to produce fourth token 150D. The parent may add his digital signature to his received portion of the agreement in third token 150C to generate fifth token 150E. The dealership may have retained first token 150A for itself.

File security tool 120 may then assemble or combine first token 150A, fourth token 150D, and fifth token 150E to form key 155. File security tool 120 may then determine whether key 145 and key 155 match. If key 145 and key 155 do not match, then file security tool 120 may determine that at least one of the signatures of the minor or the parent have been forged. In some instances, file security tool 120 may also determine that some manipulation of the agreement has occurred if key 145 does not match key 155. However, if key 145 matches key 155, then file security tool 120 may decrypt first token 150A, fourth token 150D, and fifth token 150E to generate the portions 140 of the agreement with the added digital signatures. File security tool 120 may then reassemble the sales agreement. In certain embodiments, file security tool 120 may improve the data security of electronically communicating file 135 and receiving digital signatures in file 135.

FIG. 2 illustrates a file security tool 120 of the system 100 of FIG. 1. As illustrated in FIG. 2, file security tool 120 includes a tokenizer 205 and a validator 210. Generally, tokenizer 205 divides a file 135 into portions 140 and then generates tokens 150 from portions 140. Validator 210 generally receives tokens 150 and validates those received tokens 150. In particular embodiments, file security tool 120 improves the security of a file by tokenizing distinct portions of that file.

Tokenizer 205 receives a file 135. File 135 may be formed from several parts. In the illustrated example of FIG. 2, file 135 may include five parts: a first part 215A, second part 215B, third part 215C, fourth part 215D, and fifth 215E. These parts may be arranged sequentially to form a file 135. This disclosure contemplates file 135 including any number of parts 215 arranged in any order.

Tokenizer 205 may divide file 135 into portions 140. Tokenizer 205 may combine various parts 215 of file 135 to form each portion 140. In the illustrated example of FIG. 2, tokenizer 205 forms first portion 140A, second portion 140B, and third portion 140C using various parts 215 of file 135. First portion 140A is formed using first part 215A and third part 215C. Second portion 140B is formed from second part 215B and fifth part 215E. Third portion 140C is formed using fourth part 215D. This disclosure contemplates tokenizer 205 forming a portion 140 using any parts 215 of file 135, including a random selection of parts 215. In certain embodiments, by dividing file 135 into portions 140 using non-sequential parts 215 of file 135, it may not be possible to reconstruct file 135 simply by sequentially ordering portions 140, thus improving the security of file 135. For example, if the portions 140 were stolen or intercepted during transit or if certain portions 140 were intercepted or forged, it may still not be possible to guess or reconstruct file 135 from the intercepted or forged portions 140.

Tokenizer 205 may use key 145 to generate tokens 150 using portions 140. For example, tokenizer 205 may use key 145 to encrypt portions 140 into tokens 150. In the illustrated example of FIG. 2, tokenizer 205 users key 145 to encrypt first portion 140A to generate first token 150A. Tokenizer 205 also uses key 145 to encrypt second portion 140B to produce second token 140B. Tokenizer 205 further encrypts third portion 140C using key 145 to produce third token 150C. It may not be possible to decrypt a token 150 without key 145. This disclosure contemplates tokenizer 205 using any encryption mechanism to encrypt portion 140 to produce a token 150.

In the example of a minor attempting to purchase a vehicle, tokenizer 205 may be used by a dealer to generate a sales agreement. The sales agreement may then be divided and tokenized for sending to the various parties. For example, second token 150B representing a portion of the agreement, may be sent to the minor. Third token 150C representing another portion of the agreement may be sent to the parent or guardian. The minor may sign his portion of the agreement and the parent or guardian may sign his portion of the agreement. The dealer may retain first token 150A for himself. In this manner, the dealer may be confident that the minor will not be able to forge the signature of the parent or guardian. Also, the dealer may be fairly confident that neither the minor nor the parent or guardian will manipulate or change their portion of the agreement. Thus, the integrity and the security of the sales agreement is maintained during the transaction.

In certain embodiments, tokenizer 205 may further improve the security of file 135 by adding null data into file 135 before dividing file 135 into portions 140A. By adding null data to various portions of file 135, it may become even more difficult for file 135 to be reconstructed in the event that any of portions 140 or tokens 150 are intercepted or stolen. For example, a hacker who has stolen portions 140 or tokens 150 may not know what to do with null data or may not understand what portions of the data should be null and should not be null and should be stripped or should not be stripped to reconstruct file 135.

Validator 210 receives tokens 150 and validates them. In general, validator 210 generates a second key 155 by combining received tokens 150. Validator 210 then compares second key 155 with key 145 to see if they match. If they match, validator 210 may be confident that tokens 150 have not been inappropriately handled or treated.

Validator 210 receives tokens 150. Tokens 150 may be communicated from tokenizer 205 or another party. In the illustrated example of FIG. 2, validator 210 receives first token 150A from tokenizer 205 and fourth token 150D and fifth token 150E. Using the previous example of a minor attempting to purchase a vehicle, after tokenizer 205 communicates second token 150B to the minor and third token 150C to the parent or guardian, the minor may generate fourth token 150D by signing second token 150B. Likewise, the parent or guardian may generate fifth token 150E by signing third token 150C. Validator 210 may receive fourth token 150D and fifth token 150E from the minor and the parent or guard, respectively. Validator 210 may receive first token 150A because it has been retained by the dealer.

Validator 210 may then combine first token 150A, fourth token 150D, and fifth token 150E to generate second key 160. If signatures have not been forged and if the agreement has not been manipulated, then second key 155 should match key 145. Validator 210 may compare key 145 and second key 155 to determine if they match. If they do match, validator 210 may be confident that none of the signatures have been forged and that the agreement has not been manipulated. In that event, validator 210 may decrypt first token 150A, fourth token 150D, and fifth token 150E to reproduce portions 140. Validator 210 may then use portions 140 to reconstruct file 135 with the added digital signatures.

If key 145 does not match second key 155, validator 210 may generate an alert 160 that indicates that key 145 does not match second key 155. Alert 160 may indicate that a signature has been forged and/or that the agreement and/or file 135 has been manipulated. In this manner, the dealer may be alerted that the integrity and security of file 135 has been compromised and that appropriate action should be taken. In certain embodiments, validator 210 may determine that the parent or guardian's signature has been forged if key 145 does not match second key 155. In some embodiments, validator 210 may determine that the signature of the minor and/or the signature of the parent has been forged if key 145 does not match second key 155.

File security tool 120 may include other components that prepare file 135 for processing. For example, these components may pre-fill file 135 or pre-select users 105 that need to sign file 135. In some embodiments, file security tool 120 further includes a translator that translates file 135 into a selected language. In this manner, file security tool 120 may allow for transactions to be conducted with parties that speak different languages. In particular embodiments, file security tool 120 also includes a selector. The selector may track certain characteristics of a user and make decisions concerning file 135 in response to those characteristics. For example, the selector may determine that the age of a person who is attempting to purchase a vehicle makes that person a minor. In that instance, the selector may select the parent or guardian of the minor as a person who needs to receive a portion of file 135 and who needs to sign that portion of file 135 in order for the minor to purchase the vehicle. The selector may determine that the individual is a minor by comparing the age of that person against a threshold. If the age is below the threshold, then the selector may determine that the person is a minor.

The selector may also analyze a security risk profile of an individual. The security risk profile may indicate that the individual may pose certain risks to the transaction or may pose certain security risks to file 135. For example, the selector may determine based on the risk profile that the individual has a poor credit history and would need a guarantor to sign the agreement. As another example, the selector may determine from the risk profile that the individual has a history of counterfeiting and therefore a guarantor will need to be selected and the portion of file 135 that is sent to the guarantor will be needed to be treated with additional security, such as the security provided by file security tool 120.

In certain embodiments, file security tool 120 improves the security of a file 135 during a transaction by tokenizing different portions of file 135 and then reassembling received tokens to determine whether signatures have been forged or whether file 135 has been manipulated.

FIG. 3 is a flowchart illustrating a method 300 for securing a file using the system 100 of FIG. 1. In particular embodiments, file security tool 120 performs method 300. By performing method 300, file security tool 120 improves the security of a file by dividing the file and tokenizing the divided portions of the file for various recipients.

File security tool 120 may begin by dividing a file into a first portion, a second portion and a third portion in step 305. In step 310, file security tool 120 encrypts the first, second and third portions using a first key to produce first, second and third tokens. File security tool 120 then receives fourth and fifth tokens with signatures of first and second users in step 315. In step 320, file security tool 120 combines the first, fourth and fifth tokens to produce a second key.

File security tool 120 determines whether the first key matches the second key in step 325. If the first key does not match the second key, file security tool 120 proceeds to step 330 to communicate an alert. The alert may indicate that the first key and the second key do not match and/or that signatures have been forged or that the file has been manipulated. If the first key matches the second key, file security tool 120 may proceed to step 335 to decrypt the first, fourth and fifth tokens. Once decrypted, the file may be reconstructed.

Modifications, additions, or omissions may be made to method 300 depicted in FIG. 3. Method 300 may include more, fewer, or other steps. For example, steps may be performed in parallel or in any suitable order. While discussed as file security tool 120 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and a hardware processor communicatively coupled to the memory, the hardware processor configured to:

divide a file into a first portion, a second portion, and a third portion, the file comprises a first part, a second part, a third part, a fourth part, and a fifth part in sequential order, the first portion comprises the first part and the third part, the second portion comprises the second part and the fifth part, the third portion comprises the fourth part;

encrypt the first portion using a first key to produce a first token;

encrypt the second portion using the first key to produce a second token;

encrypt the third portion using the first key to produce a third token;

communicate the second token to a first user;

communicate the third token to a second user;

receive a fourth token with a signature of the first user;

receive a fifth token with a signature of the second user;

combine the first token, the fourth token, and the fifth token to produce a second key;

determine whether the second key matches the first key;

if the second key does not match the first key, communicate an alert indicating that the first key does not match the second key; and if the second key does match the first key, decrypt first, fourth, and fifth tokens to reproduce the file.

2. The apparatus of claim 1, wherein the hardware processor is further configured to determine that at least one of the signature of the first user and the signature of the second user was forged if the second key does not match the first key.

3. The apparatus of claim 1, wherein the hardware processor is further configured to translate the file into a selected language.

4. The apparatus of claim 1, wherein the hardware processor is further configured to select the second user based on a security risk profile of the second user.

5. The apparatus of claim 1, wherein the hardware processor is further configured to determine that an age of the first user is below a threshold.

6. The apparatus of claim 1, wherein the hardware processor is further configured to add null data into the file before dividing the file.

7. A method comprising:

dividing a file into a first portion, a second portion, and a third portion, the file comprises a first part, a second part, a third part, a fourth part, and a fifth part in sequential order, the first portion comprises the first part and the third part, the second portion comprises the second part and the fifth part, the third portion comprises the fourth part;

encrypting the first portion using a first key to produce a first token;

encrypting the second portion using the first key to produce a second token;

encrypting the third portion using the first key to produce a third token;

communicating the second token to a first user;

communicating the third token to a second user;

receiving a fourth token with a signature of the first user;

receiving a fifth token with a signature of the second user;

combining the first token, the fourth token, and the fifth token to produce a second key;

determining whether the second key matches the first key;

if the second key does not match the first key, communicating an alert indicating that the first key does not match the second key; and if the second key does match the first key, decrypting first, fourth, and fifth tokens to reproduce the file.

8. The method of claim 7, further comprising determining that at least one of the signature of the first user and the signature of the second user was forged if the second key does not match the first key.

9. The method of claim 7, further comprising translating the file into a selected language.

10. The method of claim 7, further comprising selecting the second user based on a security risk profile of the second user.

11. The method of claim 7, further comprising determining that an age of the first user is below a threshold.

12. The method of claim 7, further comprising adding null data into the file before dividing the file.

13. A system comprising:

a device of a first user; and a file security tool comprising a hardware processor, the hardware processor configured to:

divide a file into a first portion, a second portion, and a third portion, the file comprises a first part, a second part, a third part, a fourth part, and a fifth part in sequential order, the first portion comprises the first part and the third part, the second portion comprises the second part and the fifth part, the third portion comprises the fourth part;

encrypt the first portion using a first key to produce a first token;

encrypt the second portion using the first key to produce a second token;

encrypt the third portion using the first key to produce a third token;

communicate the second token to the first user;

communicate the third token to a second user;

receive, from the device, a fourth token with a signature of the first user;

receive a fifth token with a signature of a second user;

combine the first token, the fourth token, and the fifth token to produce a second key;

determine whether the second key matches the first key;

if the second key does not match the first key, communicate an alert indicating that the first key does not match the second key; and if the second key does match the first key, decrypt first, fourth, and fifth tokens to reproduce the file.

14. The system of claim 13, wherein the hardware processor is further configured to determine that at least one of the signature of the first user and the signature of the second user was forged if the second key does not match the first key.

15. The system of claim 13, wherein the hardware processor is further configured to translate the file into a selected language.

16. The system of claim 13, wherein the hardware processor is further configured to select the second user based on a security risk profile of the second user.

17. The system of claim 13, wherein the hardware processor is further configured to determine that an age of the first user is below a threshold.

18. The system of claim 13, wherein the hardware processor is further configured to add null data into the file before dividing the file.

* * * * *